Nov. 10, 1970   F. KOHNER ETAL   3,538,620
SELECTIVELY MANUALLY OPERABLE EDUCATIONAL TOY
Filed March 18, 1968   2 Sheets-Sheet 1

INVENTORS
FRANK KOHNER
ANTHONY N. D'ELIA
EDWARD M. STOLARZ

ATTORNEYS

Nov. 10, 1970    F. KOHNER ETAL    3,538,620
SELECTIVELY MANUALLY OPERABLE EDUCATIONAL TOY
Filed March 18, 1968    2 Sheets-Sheet 2
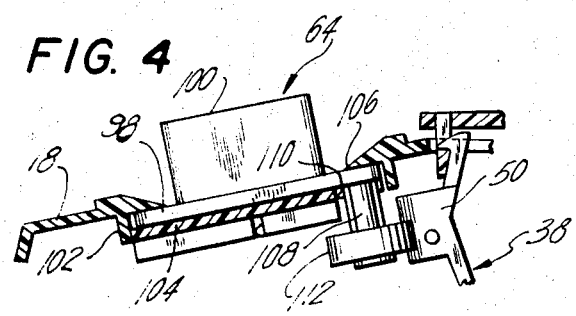
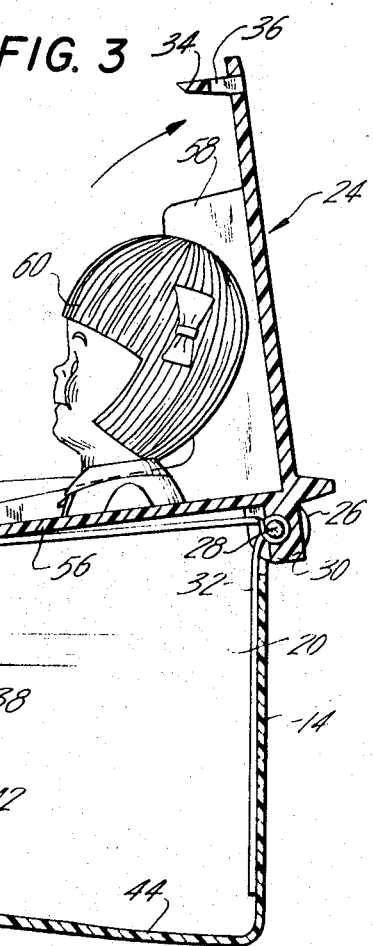
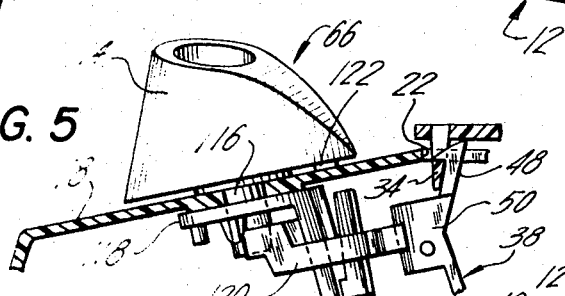
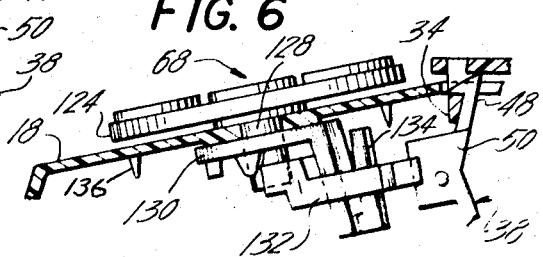
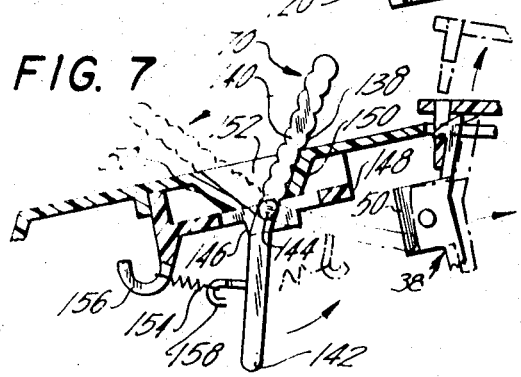
INVENTORS
FRANK KOHNER
ANTHONY N. D'ELIA
BY    EDWARD M. STOLARZ
ATTORNEYS United States Patent Office 3,538,620
Patented Nov. 10, 1970

3,538,620
**SELECTIVELY MANUALLY OPERABLE
EDUCATIONAL TOY**
Frank Kohner, Washington Heights, Anthony N. D'Elia, Riverdale, and Edward M. Stolarz, Yorktown Heights, N.Y., assignors to Kohner Bros., Inc., East Paterson, N.J., a corporation of New York
Filed Mar. 18, 1968, Ser. No. 713,817
Int. Cl. G09b *19/00*
U.S. Cl. 35—8                                 11 Claims

ABSTRACT OF THE DISCLOSURE

A selectively manually operable educational toy composed of a base pivotally supporting a row of trap doors. Each trap door has fixed at an angle to the door a stand on which a small figure is mounted. The doors are individually held latched to the base under spring loading in positions in which the stands and figures are concealed from view. The doors can be selectively unlatched to allow the springs to snap the figures to exposed positions in response to manual actuation of manipulative control elements associated with the different doors. The control elements are carried by the base, each in physical proximity to the door with which it is associated. The different control elements are secured to the base in a manner such as to permit, for each, a different mode of manipulation that will unlatch the associated door. The control elements and their modes of manipulation simulate common household controls such as a push button, a slide button, an oscillatory knob, a telephone dial and a toggle-switch lever.

BACKGROUND OF THE INVENTION

Field of the invention

Educational toy with several control elements manually operable in different simple fashions to selectively display different figures.

Description of the prior art

In this era of ever-increasing technilogical complexity wherein individuals strive to acquire extensive backgrounds of education and skills before reaching their adult years, the initiation of education constantly is being pushed back to earlier ages in order to lengthen the learning span. Indeed, early educational efforts now are being channeled to almost the cradle by designing toys to instil the acquisition of knowledge. One manner of education, to which the present invention pertains, is that of manual skill and coordination. It is desirable to give children at an early age exercise, guidance and training in the use of their hands. It has been proposed that this be accomplished by providing toys with manipulative elements that simulate control devices that they see their elders operate and which are indigenous to their surroundings. One such popular toy supplies several manually manipulative elements such as push buttons, slides, clock hands, knobs, dials and levers which are contrained for movements normally affiliated with such elements, the aim being that a child of tender year, for example as young as eight months, will thereby be provided with a device which assists in training the child's manual adroitness. It is the intention that the child will try to ape its elders and, being given elements which visually resemble and move in the same fashion as elements which it sees operated by its parents an siblings, it too will be inclined to move such elements in a proper manner.

Nevertheless, such toys do not, on the average, successfully reach very early age groups. It is true that by making the manipulative elements bigger than life size, by imparting bright colors to the elements and by causing the elements to resemble the shapes and movements of manipulative elements of the child's surroundings, a momentary interest will be aroused in the child that will suffice to result in efforts to minic observed movements, but such interest is short-lived, particularly in very young children. The child will be able to move the manipulative elements of the toy in a proper manner but he will not be aware that a given movement is proper except by the fact that it is the only movement posible with a specific element. Moreover, the toy has only a limited play value—the ability to move the elements—so that there is little incentive to repeatedly move the elements in proper fashions and in so doing to gain manual dexterity and coordination acquired by repetition. Thus a child, particularly a very young child, will tire quickly of the toy and the toy will not succeed in its desired function.

SUMMARY OF THE INVENTION

It is an object of the present invention to provide an improved educational toy with environment-simulative manipulative elements and which further includes an arrangement such that the play interest of the toy is enhanced and an urge is developed to operate the elements over and over again.

It is another object of the invention to provide a toy of the character described which will stimulate a child to attempt to manipulate the elements properly and then to do so for protracted periods of time.

It is another object of the invention to provide a toy of the character described which supplies incentives, in the form of rewards, to operate the elements in proper modes.

It is another object of the invention to provide a toy of the character described wherein the incentive constitutes a sudden, eye-catching movement that will attract a young child and which will display a pleasurable object that will draw the child's fancy.

It is another object of the invention to provide a toy of the character described wherein the visual incentive associated with the correct movement of a given element is disposed in physical proximity to that element so that the reward will constitute a reinforcement confirming the correctness of movement of such element to the child.

It is another object of the invention to provide a new and novel educational toy for children of preschool age and, indeed, even for children who have not reached their first birthday.

It is another object of the invention to provide the toy of the character described which will impart to a child a heightened awareness of his surroundings and of sundry manipulative elements which are a part of his surroundings.

It is another object of the invention to provide a toy of the character described which is simple for a child to comprehend and operate, is rugged in construction and is inexpensive to fabricate.

Other objects of the invention in part will be obvious and in part will be pointed out hereinafter.

The invention accordingly consists in the features of construction, combinations of elements and arrangements which will be exemplified in the toy hereinafter described and of which the scope of application will be indicated in the appended claims.

In general, the several objects of the invention are secured by providing a toy that comprises a rectangular hollow base having a broad slot extending across the base alongside and adjacent the rear edge of the top wall of the base. Several trap doors are attached to the rear edge of the slot for pivotal movement relative thereto about a common axis of rotation. The trap doors are in side-by-side juxtaposition and are of identical size and rectangular shape. Each trap door is spring-loaded to an erect position. Further, each trap door is provided with a catch which engages a latch that holds the trap door flat against the top wall of the base in what will be referred to as the "closed" position of the trap door. The trap doors in their closed positions cover the broad slot. Additionally each trap door includes an integral stand perpendicular to the door and extending into the base when the door is closed so as to hide the stand from view. Each stand serves as the support for a small figure such as the head and upper torso of a boy or a girl, an animal, or an inanimate object. The figures likewise are concealed when the trap doors are closed. Each trap door and stand conjoin to form a bracket composed of two panels defining a dihedral angle the apex of which is hinged to the rear edge of the slot about a common pivot. The latches are carried by the tips of cantilever-mounted flat springs which when individually selectively forced away from catch retaining position will release their associated doors and allow the same to snap up under the influence of the springs to thereby swing the doors to erect "open" positions in which the stands and figures are exposed.

Along the top wall of the base and in physical proximity to the trap doors are manually manipulatable control elements, each different one of which is simulative in configuration of a different control element indigenous to a child's modern-day surroundings. Moreover each different control element of the toy is so supported on the top wall as to be constrained for a certain type of movement that is charatceristic of the real control element whose appearance it simulates. Each different control element is located in the immediate vicinity of a different trap door with which it is associated. Typically, one of the toy control elements is a push button mounted to reciprocate in a direction perpendicular to the top wall of the base and biased upwardly. A second element is a slide button mounted to reciprocate parallel to the length of the slot. A third element is a knob mounted to oscillate about an axis perpendicular to the top wall of the base. A fourth element is a disc with a series of finger openings adjacent its periphery and mounted to rotate about an axis perpendicular to the top wall of the base. The fifth element is a lever mounted to oscillate about an axis parallel to the length of the slot and slightly below the base. The first element simulates an off-on electric switch button such as is used to control an electric light or an electric appliance. The second element simulates a button for a mechanical latch or an off-on electric switch. The third element simulates a knob such as is used to control a gas flame, electric lighting intensity or the temperature of the heating coil of an electric range. The fourth element simulates a telephone dial. The fifth element simulates a lever for a toggle-type or mercury type off-on wall switch for an electric light. Each control element of the toy is functionally integral with a different actuating member so located with respect to the trap door with which the element is associated that when the element is operated in its proper manner—the only manner in which that element is capable of operation—the member will engage and press the flat spring in a direction to release the catch of the associated trap door whereby selective proper operation of a control element will, as a reward for that operation, snap open the immediately adjacent trap door and display a figure.

BRIEF DESCRIPTION OF THE DRAWINGS

In the accompanying drawings in which is shown one of the various possible embodiments of the invention.

FIG. 3 is an enlarged sectional view taken substantially along the line 3—3 of FIG. 1, showing the push button control element in depressed (actuated) position in solid lines and the trap door open, the idle position of the control element being illustrated in dot-and-dash lines;

FIGS. 4, 5 and 6 are enlarged sectional views taken substantially along the lines 4—4, 5—5 and 6—6, respectively, of FIG. 1; and FIG. 7 is an enlarged sectional view taken substantially along the line 7—7 of FIG. 1 showing in solid lines the idle position of the control element, the closed position of the trap door and the catch holding position of the spring mounted latch, and showing in dot-and-dash lines the operated position of the control element, the just-released position of the trap door and the catch disengaging position of the spring-mounted latch.

DESCRIPTION OF THE PREFERRED EMBODIMENT

Figures 1, 2:
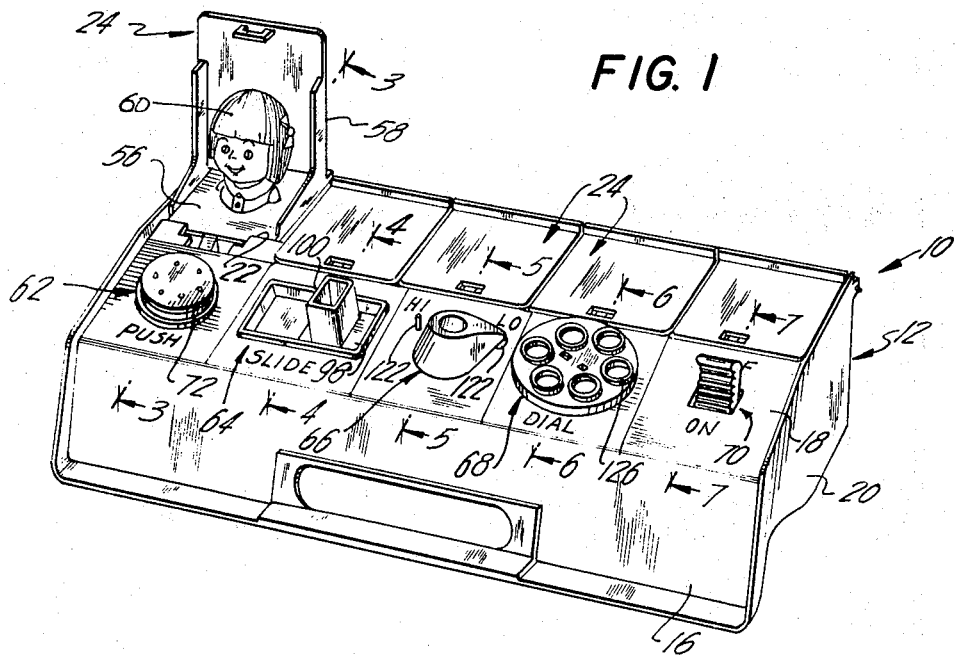
FIG. 1 is a perspective view of an educational toy embodying the present invention with all of the trap doors, except one, being shown closed.
FIG. 2 is a bottom view of the toy.

Referring now in detail to the drawings, the reference numeral 10 denotes a toy embodying the present invention. Said toy includes a rectangular hollow base 12 composed of a back wall 14, a front wall 16, a top wall 18 and end walls 20. The back wall is perpendicular to any horizontal flat surface on which the toy rests. The front wall slopes slightly rearwardly. The end walls protrude a short distance above the top and front walls. The front half of the top wall slopes upwardly and rearwardly at a slight angle. The rear half of the top wall is substantially parallel to the supporting surface for the toy. The top wall is formed with a broad slot 22 which extends across the base alongside of and adjacent the rear edge of the top wall 18.

Several trap doors 24 are provided. The rear edges of the trap doors pivotally secured to the base at the rear edge of the slot 22 for rotation about a common axis. This is accomplished by forming a series of bearings 26 integral with the upper edge of the back wall 14 (see FIGS. 2 and 3). The openings through all of the bearings are in registry with one another. A shaft 28 extends through all of these openings and constitutes a single pivot shaft for all the trap doors. The base bearings 26 are mutually spaced apart to provide gaps for reception of door bearings 30 integral with the rear edges of the trap doors. Each trap door has two such bearings 30, these bearings being rotatable on the shaft 28.

Suitable means is included to rotatably bias the trap doors upwardly away from the top wall 18. Such bias means constitutes, for each trap door, a different torque spring 32. Each such spring is a resilient wire shaped to include a central portion in the form of a helical coil loosely wrapped about the shaft 28 and two terminal portions or legs, one of which presses against the inner surface of the back wall 14 and the other of which presses against an element hereinafter to be described as a "stand" which is integral with the associated trap door. The spring is torsionally stressed when the trap door is in its "closed" position wherein it is flat against the rear half of the top wall 18.

In its closed condition each trap door is immediately adjacent and above the rear half of the top wall 18. It cannot be depressed any lower because of abutment of the tip of the trap door against the upper surface of the top wall at the front edge of the slot 22. The trap door is held in closed position by a selectively disengageable retaining means, there being a different such means for each trap door. Each said retaining means constitutes the cooperative combination of a catch and a latch. Specifically, each trap door has a catch and there is for each trap door a different latch carried by the base 12. The catch is in the form of a bail 34 of which a different one is integral with each trap door. The bail is located at the center of the tip of the trap door, extending downwardly from the trap door when the trap door is in closed position. The bail provides an opening 36.

For each trap door there is, as just indicated, a different latch 38. A typical latch is best illustrated in FIG. 3. The latch is of the cantilever spring type. Each latch has a base leg 40 which is fixed to an upstanding ledge 42 forming a part of the base 12. Specifically, the ledge is located at the front edge of a bottom wall 44 of the base which extends forwardly from the bottom edge of the back wall 14. An erect flat web 46 extends upwardly from the base leg 40. The leg and web 46 are integral and are formed from a resilient material, such, for instance, as a synthetic plastic. At the tip of the web 46 there is provided a latch 48 in the shape of a hooked dog. The forwardly extending barb of the dog is designed to enter the opening 36 (see FIGS. 4–7) when the trap door is depressed. The bail 34 has a chamfered tip, which, as the trap door is depressed into closed position, will cam the latch 48 and web 46 rearwardly until the barb of the hook clears the portion (base) of the bail below the opening 36. Thus, the web 46 is flexed rearwardly, building up a stress, so that as soon as the barb reaches the opening the web and latch will spring forwardly to retain the trap door in closed position. The web 46 also includes a cam follower 50 in the shape of a half cylinder on its front face immediately below the dog. The convex surface of the cam follower faces forwardly. The function of the follower will be described hereinafter.

In addition, the web includes a pair of laterally extending pegs 52, the purpose of which is to prevent a child from forcing the web so far rearwardly that the web would snap. Before this can happen the pegs 52 will abut strips 54 which integrally connect the ledge 42 to the top wall 18. These strips are located within the base between adjacent trap doors.

Each trap door has integral therewith a stand 56. The stand is perpendicular to the trap door so that the stand and trap door conjointly form a channel-shaped element. The door bearings 30 previously described from a part of this element, being located at the apex of the dihedral angle formed by the trap door and stand. The elements are reinforced by gusset flanges 58 located at the opposite edges of the trap door and stand.

Each stand serves as the support for a different small figure 60, such, for instance, as the head and upper torso of a boy or a girl or an animal, or as an inanimate object. The figure is appropriately shaped and interestingly colored so as to attact the attention of a child playing with the toy. It will be appreciated that in the closed position of the trap doors each stand projects vertically downwardly into the hollow interior of the base so that the stand is concealed and so that, likewise, the small figure is concealed from view within the base. Obviously, when the cam follower 50 is urged rearwardly to render the retaining means ineffective and allow the trap door to spring upwardly, the figure will be exposed. Upward swinging movement of the trap door is limited by abutment of the tip of the stand 56 with the undersurface of the top wall 18 adjacent the front edge of the slot 22.

The toy further includes several manually manipulatable control elements each different one of which is associated with a different trap door 24. The association is both a physical one and a functional one; that is to say, each control element when operated will render ineffective the retaining means for an associated trap door so that when a control member is actuated the trap door will snap up and the figure thereon will pop up. Moreover, each control element is in physical proximity to the trap door associated therewith, i.e., is located near the associated trap door so that a child will associate each different control element with a specific different trap door which is adjacent the same. Five manually manipulatable control elements 62, 64, 66, 68, 70 are provided, each one for a different trap door. Each of these elements 62–70 is simulative in configuration of the configuration of a different real control element indigenous to a child's modern-day surroundings and moreover each such control element 62–70 is so mounted on the top wall 18 of the base 12 as to be constrained for a single specific type of movement that is characteristic of the real control element whose appearance it simulates.

The control element 62 simulates a push button such as is used for an electric switch that controls an electric light or an electric appliance or is used in an automatic elevator. The control element 64 simulates a slide button such as is used for an off-on electric switch for lights and appliances or for manipulating latches. The control element 66 simulates a knob such as is used to control a gas flame or the intensity of an electric light or the temperature of a heating coil of an electric range. The control element 68 simulates a telephone dial. The control element 70 simulates a lever such as is used for a toggle type or a mercury type wall switch for turning an electric light on or off. Each of these control elements will now be described in detail as will the structure for rendering ineffective the retaining means for the associated trap door.

Referring to FIGS. 1–3, the manually manipulatable push button control element 62 comprises a hollow cylinder 72 having a top wall 74 provided with perforations 76. The bottom of the cylinder is open. Diametrically opposed keys 78 extend radially away from the side of the cylinder. The cylinder is axially slidable in a two-piece cylindrical cup 80 having a bottom wall 82 and an open top. The bottom wall is provided with perforations 84. A flange 86 extends away from the cup near its open top. The flange is received in a shallow well formed on the under surface of the inclined front half of the top wall 18 and is held thereto as by adhesive or fusion welding. The sides of the cup 80 are formed with longitudinal diametrically opposed slots 88 in which the keys 78 are slidable. Thereby the hollow cylinder 72 is constrained for movement longitudinally of the cup 80. Since the longitudinal axis of the cup is perpendicular to the top wall 18, the cylinder 72 can only move in such a perpendicular direction and it is this which causes said cylinder to simulate a push button. Moreover, the cup 80 has an integral internal sleeve 90 concentric with the external side wall of the cup and dimensioned to be a nice slidable fit with the internal surface of the cylinder 72 thereby further constraining said cylinder for movement in a direction perpendicular to the wall 18.

Cross webs 92 within the sleeve 90 extend upwardly from the bottom wall 82 of the cup 80 to limit the free space defined by the interior of the cylinder 72. Captively located in this free space is a plastic circumferentially corrugated resilient bellows 94 whose unstressed axial dimension exceeds that of the free space under the top wall 74 of the cylinder 72 when the cylinder is in its uppermost protruding position with the keys 78 abutting the upper edges of the slot 88. Hence, the bellows acts as a means biasing the cylinder 72 to its uppermost position. The perforations 76, 84 permit the cylinder to move freely in and out of the cup 80. The bellows 94 has perforations (not shown) in its bottom wall and a reed type noise maker 96 is secured to and penetrates its side wall. The noise maker is so constructed as to emit a raucous squeak when the bellows is compressed to force air through the noise maker. Thereby when the cylinder 72 is pushed down a sound will be engendered, this being a pleasing attraction for a child.

The cup 80 has a portion of its side wall located in proximity to the cam follower 50 for the latch 38 that retains in closed position the trap door 24 immediately adjacent and associated with the push button control element 62. One of the keys 78 mounted on the cylinder 72, which key is the one facing the latch 38, is formed in the shape of a ramp or wedge which flares upwardly away from the bottom of said cylinder. In the uppermost position of the cylinder 72 the upper tip of the ramp is above and clear of the associated cam follower 50 in its catch engaging position. When the cylinder 72 is pushed down, as by a child, the sloping ramp will engage the cam follower 50 and force the same rearwardly whereby to cause the latch 48 to clear the bail 34. This allows the associated trap door 24 to swing back under the action of the torsionally stressed spring 32.

When a child playing with this particular control element 62 pushes the same down he will be rewarded with movement of the associated trap door. This movement, as well as the accompanying snap-up sound of the trap door when the stand 56 strikes the top wall, serves as a reinforcement to the child, letting him know that he has performed a correct manual manipulation of the element 62. Thus he will be encouraged to try this again and again until finally his unskilled fingers will acquire the requisite manual dexterity and coordination which is the object of this toy to provide. He will in the first instance, of course, be unaware of how to move the cylinder (pushbutton) 72. However, he will be guided to a great extent by observation of his elders and eventually will associate with the shape of the pushbutton the proper type of movement. Of course, he can also be instructed by guidance as to the proper manipulation of the pushbutton 72 and eventually the child will acquire sufficient facility and will associate in his mind the shape of the pushbutton with its proper movement so that after some time he will understand the correct way of operating the button and, as noted above, each time that he does perform this in the only manner in which the button is capable of moving he will have a reward in the opening of the trap door.

The manually manipulatable control element 64, (see FIG. 4) which is a slide button, is in the form of a flat slide plate 98 having extending upwardly therefrom a slide button 100. In order to constrain the slide button for proper movement of this type of element, the slide plate 98 is captively held in a shallow recess that is longer than the plate, being elongated in a direction parallel to the slot 22. The slide plate 98 is of rectangular configuration and the recess for the same is of like configuration except for its elongation. Said recess is provided by forming a shallow rectangular well 102 on the under surface of the top wall 18 and by closing the open bottom end of said well with a plate 104 that is parallel to the wall 18. The distance from the plate to the bottom of the wall 18 is barely in excess of the dimension of the plate 98, the clearance being enough to allow slidable movement. The top wall 18 is provided with an opening 106 which overhangs the side edges of the plate 104 so that the slide plate 98 is captive within the recess and yet the button 100 which protrudes through the opening 106 is free to move left to right with respect to the top wall 18.

In order to enable movement of the slide button 100 to disengage the retaining means associated with the trap door 24 in the immediate vicinity of said button, the slide plate 98 mounts a downwardly depending stud 108. An elongated slot 110 is formed on the rear edge of the closure plate 104 to permit the stud 118 to extend below said plate. The tip of the stud 108 rotatably supports a roller 112.

When the slide button 100 is in either its extreme left or right position, determined by abutment of the button with side edges of the opening 106, the roller 112 clears the cam follower 50 of the associated trap door, being either to the left or right thereof respectively. However, the roller is in transverse alignment with the cam follower so that when the cam follower is moved from either extreme position to the opposite extreme position the roller will, somewhere near the middle of its travel, engage the cam follower 50 and press the same rearwardly. This, of course, as previously described, will release the latch 38 from the catch 34 of that trap door and allow said trap door to spring upwardly exposing the small figure 60. Hence, here too the child, once he has been able to perfect the required movement, will be rewarded with motion and a view of a pleasurable object which serves to encourage him both in his knowledge that he has performed the correct movement and in an urge to repeat the same movement. It will be observed that the slide button 100 is constrained solely for a single type of desired movement.

It also will be observed that all the control elements are each directly in line with and below their associated trap doors.

The manually manipulatable control element 66 (see FIG. 5) includes a knob 114. The knob either may be generally circular or it may be of a radial type, the latter being illustrated. The knob is mounted to turn about an axis perpendicular to the top wall 18 and for this purpose the knob is fastened to a shaft 116 which is journaled in an opening in the top wall 18. Secured to the shaft is a plastic washer 118 which prevents the knob from being withdrawn from the base. Also fastened to the shaft 116 is a flat radial cam 120. The plane of the cam intersects the cam follower 50 of the associated latch 38. When the knob 114 is so positioned that the cam 120 is to either side of the follower 50 said cam will clear the follower. However, the cam is of such radial length that when the cam is moved from a position on one side of the follower to a position in which the cam is on the other side of the follower the cam will in mid position engage the follower 50 and force the same rearwardly to an extent such as to cause the dog 48 to disengage the bail 34, allowing the associated trap door to spring upwardly. The upper surface of the top wall 18 of the toy is formed with a pair of protuberances 122 which limit the rotary movement of the knob so that the knob actually is limited to an oscillatory motion about an axis perpendicular to the top wall 18 and which includes the axis of the shaft 116. Here, once again, proper motion of the knob 114 will reward the child with a release of the associated trap door.

The manually manipulatable control element 68 (see FIG. 6) constitutes a circular disc 124 provided with a circularly arranged series of finger apertures 126. These make the disc 124 simulative of a telephone dialing disc, although the simulation is not carried to an extreme where there is a gap between two of the apertures which exceeds the gap between all of the remaining apertures, nor is the number of apertures necessarily equal to the ten apertures conventionally provided in a real telephone dialing disc. However, the simulation has been found to be sufficient for a child to associate the operation of such a disc with that of a real telephone dialing disc.

The disc 124 is fastened to a shaft 128 which is rotatably journaled in an aperture in the top wall 18 so that the disc can turn about an axis perpendicular to said wall. A washer 130 is secured to the shaft 128 immediately below the top wall so as to prevent the disc from being pulled off the base. Also secured to the shaft 128 is a flat radial cam 132 which is identical to the cam 120 and operates in the same manner, to wit, by, at a certain point of its travel, bearing against the associated cam follower 50 so as to release the dog 48 from the associated bail 34. As in the case of all of the other control elements above described, this will reward the child and confirm that his operation of the control element is correct. To heighten the simulation of the control element 68 to a telephone dialing disc the washer 130 is provided with a flexible resilient reed 134 which is radially offset from the shaft 128 and which is supported in cantilevered fashion at a point spaced downwardly from the top wall 18, the tip of the reed extending toward the top wall 18 and being free. A circular series of projections 136 on the under surface of the top wall concentrically disposed around the shaft 128 are radially aligned with the tip of the reed 134 so that as the disc is rotated the reed will strike and pass the projections in turn, each time causing a click to be sounded.

The manually manipulatable element 70 (see FIG. 6)

constitutes a bell crank lever 138 including a handle arm 140 and a release arm 142. The lever has a pair of trunnions 144 intermediate its ends. Said trunnions are journaled in bearings formed in the opposite side walls 146 of a slot provided in a plate 148 mounted below and parallel to the top wall 18. The trunnions mount the lever 138 for oscillation about an axis a short distance below the top wall 18 and parallel to the length of the slot 22. The rocking movement of the lever is limited by abutment of the handle arm 140 against the converging front and back walls 150 of an open-bottomed well 152 formed in the top wall 18 directly in front of the associated trap door. The handle arm projects up through said well and above the top wall for manual actuation thereof. A coil spring 154 is tensioned between a hook 156 in front of the release arm and a hook 158 extending forwardly from the front face of said arm. The spring biases the handle arm 140 rearwardly and the release arm forwardly, said release arm in the idle position of the handle being spaced from the cam follower 50 of the associated trap door. The tip of said release arm swings through a path that intersects said cam follower. Thereby when the handle arm 140 is pulled forward to the dot-and-dash position shown in FIG. 6, its tip will press the cam follower rearwardly to force the dog 48 rearwardly and thus release the bail 34. Thereupon the trap door 24 will spring up to expose the stand 56 and FIG. 60.

It thus will be seen that there has been provided a novel toy which achieves the several objects of this invention and which is well adapted to meet the conditions of practical use.

As various possible embodiments might be made of the above invention and as various changes might be made in the embodiments set forth, it is to be understood that all matter herein described or shown in the accompanying drawings is to be interpreted as illustrative and not in a limiting sense.

Having thus described the invention there is claimed as new and useful and desired to be secured by Letters Patent:

1. A selectively manually operable educational toy comprising:
 (a) a base;
 (b) several trap doors;
 (c) means mounting each trap door for movement toward and away from the base;
 (d) means spring loading each trap door for movement away from the base;
 (e) a different figure associated with each trap door and concealed from view within the base when the trap door is adjacent the base, said figure being exposed to view when the trap door moves away from the base;
 (f) selectively disengageable retaining means for each trap door to hold such door adjacent the base;
 (g) several manually manipulatable cotrol elements, a different one associated with each different trap door, each control element being located in physical proximity to its associated trap door;
 (h) means mounting each manually manipulatable control element on the base for movement relative thereto in a manner simulative of a real control element, each manually manipulatable control element physically resembling the real control element whose movement it simulates, the means mounting each manually manipulatable control element on the base mounting the same in such fashion that each said control element is movable relative to the base in a manner different from many of the other control elements; and
 (i) means operated by each manually manipulatable control element upon the actuation thereof for rendering the retaining means holding the associated trap door ineffective in order to allow such trap door to be spring urged away from the base so as to reward the user of the toy for correctly moving each control element.

2. A toy as set forth in claim 1 wherein the trap doors are mounted for pivotal movement on the base.

3. A toy as set forth in claim 2 wherein all the trap doors are mounted for pivotal movement about a common axis.

4. A toy as set forth in claim 2 wherein each trap door has a functionally unitary stand at a substantial angle thereto and concealed within the base when the trap door is adjacent the base and wherein the figures are mounted on the stands so as to be concealed when the trap doors are adjacent the base and to be exposed when the trap doors move away from the base.

5. A toy as set forth in claim 1 wherein the retaining means for each trap door constitutes a first member carried by the trap door, a second member releasably engagable with the first member, and a spring carried by the base and supporting the second member, said spring biasing the second member into retaining engagement with the first member when the trap door is adjacent the base, and wherein the means for rendering the retaining means ineffective constitutes for each control element an actuating element moved by the control element and a cam follower functionally integral with the second member and engaged by the actuating element upon movement of the control element so as to disengage the second member from the first member.

6. A toy as set forth in claim 5 wherein one of the manually manipulatable control elements is a push button mounted to move perpendicular to the base, said control element having as the actuating element a cam operator in whose linear path of travel the cam follower lies.

7. A toy as set forth in claim 5 wherein one of the manually manipulatable control elements is a slide button mounted to slide parallel to the top of the base, said control element having as the actuating element a cam operator in whose linear path of travel the cam follower lies.

8. A toy as set forth in claim 5 wherein one of the manually manipulatable control elements is a rotary member mounted to turn about an axis perpendicular to the top of the base, said control element having as the actuating element a radial cam operator in whose rotary path of travel the cam follower lies.

9. A toy as set forth in claim 5 wherein one of the manually manipulatable control elements is a lever mounted to rock about an axis parallel to the top of the base, said lever having a handle arm above the base and a release arm below the base, said release arm being the actuating element in whose oscillatory path of travel the cam follower lies.

10. A toy as set forth in claim 5 wherein the spring is a flat cantilever spring having the second member adjacent the tip thereof, said spring supporting the cam follower remote from the cantilever mounting for the spring.

11. A selectively manually operable educational toy comprising:
 (a) a base;
 (b) several trap doors;
 (c) means mounting each trap door for movement toward and away from the base;
 (d) means spring loading each trap door for movement away from the base;
 (e) a different figure associated with each trap door and concealed from view within the base when the trap door is adjacent the base, said figure being exposed to view when the trap dor moves away from the base;
 (f) selectively disengageable retaining means for each trap door to hold such door adjacent the base;
 (g) several manually manipulatable control elements, a different one associated with each different trap door, each control element being located in physical proximity to its associated trap door;

(h) means mounting each manually manipulatable control element on the base for movement relative thereto in a manner simulative of a real control element, each manually manipulatable control element physically resembling the real control element whose movement it simulates, the means mounting each manually manipulatable control element on the base mounting the same in such fashion that each said control element is movable relative to the base in a manner different from many of the other control elements;

(i) means operated by each manually manipulatable control element upon the actuation thereof for rendering the retaining means holding the associated trap door ineffective in order to allow such trap door to be spring urged away from the base so as to reward the user of the toy for correctly moving each control element;

(j) the retaining means for each trap door constituting a first member carried by the trap door, a second member releasably engageable with the first member, and a spring carried by the base and supporting the second member, said spring biasing the second member into retaining engagement with the first member when the trap door is adjacent the base, the means for rendering the retaining means ineffective constituting for each control element an actuating element moved by the control element and a cam follower functionally integral with the second member and engaged by the actuating element upon movement of the control element so as to disengage the second member from the first member;

(k) one of the manually manipulatable control elements being a push button mounted to move perpendicularly to the base, this control element having as the actuating element thereof a cam operator in whose linear path of travel the associated cam follower lies;

(l) another one of the manually manipulatable control elements being a slide button mounted to slide parallel to the top of the base, this control element having as the actuating element thereof a cam operator in whose linear path of travel the associated cam follower lies;

(m) another one of the manually manipulatable control elements being a rotary member mounted to turn about an axis perpendicular to the top of the base, this control element having as the actuating element thereof a radial cam operator in whose rotary path of travel the cam follower lies; and (n) another one of the manually manipulatable control elements being a lever mounted to rock about an axis parallel to the top of the base, said lever having a handle arm above the base and a release arm below the base, said release arm being the actuating element for this control element and in whose oscillatory path of travel the associated cam follower lies.

References Cited

UNITED STATES PATENTS

| | | | |
|---|---|---|---|
| 2,449,116 | 9/1948 | Hatchett | 46—145 X |
| 2,581,004 | 1/1952 | Damiano | 46—146 X |
| 2,623,303 | 12/1952 | Mindel. | |

WILLIAM H. GRIEB, Primary Examiner

U.S. Cl. X.R.

35—29; 46—146